C. NEWMAN.
LAMP.
No. 7,029. Reissued April 4. 1876.
Fig. 1.
Fig. 2.
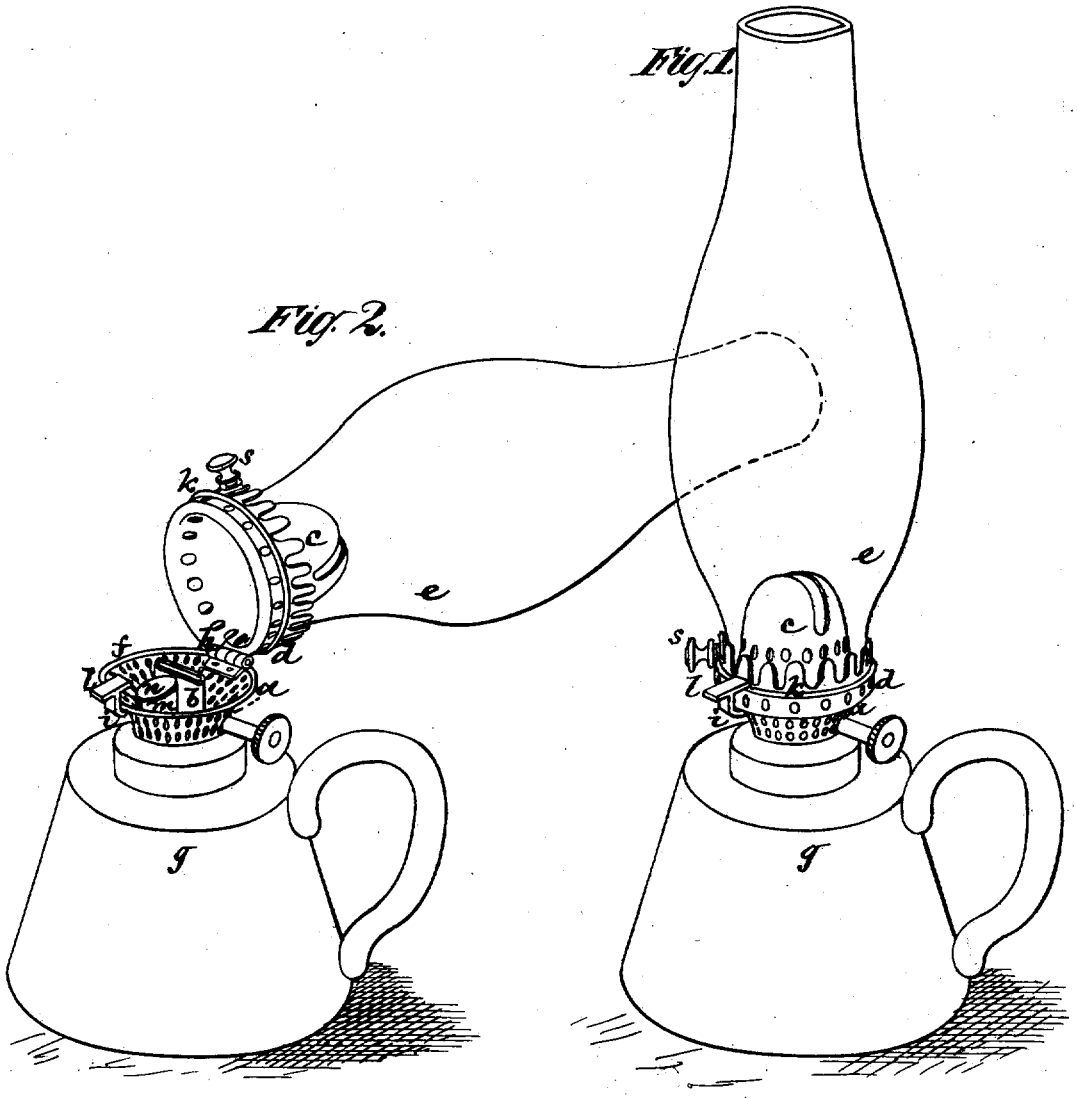
Fig. 3.
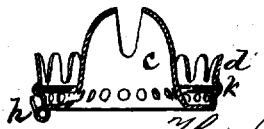
Witnesses
John Becker.
Jno. Haynes
Inventor,
Carlton Newman,
The Ives Patent Lamp Company
by its Attorneys
Brown & Allen
N. PETERS, PHOTO-LITHOGRAPHER, WASHINGTON, D. C.

UNITED STATES PATENT OFFICE

CARLTON NEWMAN, OF PITTSBURG, PA., ASSIGNOR, BY MESNE ASSIGNMENTS, TO THE IVES PATENT LAMP COMPANY, OF NEW YORK CITY.

IMPROVEMENT IN LAMPS.

Specification forming part of Letters Patent No. 33,047, dated August 13, 1861; reissue No. 7,029, dated April 4, 1876; application filed March 16, 1876.

DIVISION A.

*To all whom it may concern:*

Be it known that CARLTON NEWMAN, of Pittsburg, in the county of Allegheny and State of Pennsylvania, invented an Improvement in Lamps, of which the following is a full, clear, and exact description, and for which Letters Patent were issued to said NEWMAN August 13, 1861, and the exclusive right to which Letters Patent is now vested, by assignment, in the IVES PATENT LAMP COMPANY, of New York, reference, in explanation of the invention, being had to the accompanying drawing, which forms part of this specification.

Figure 1 is a perspective representation of a lamp having the invention applied. Fig. 2 represents the same lamp with the crown-piece or top of the burner-frame turned up on its hinge, so as to expose the wick-tube and the feed or supply tube, for the purpose of lighting the lamp, trimming the wick, or replenishing the oil or fluid. Fig. 3 is a vertical section of a hinged crown-piece and cone.

This improvement is designed to obviate a serious inconvenience in the use of lamps for burning coal and other oils or fluids, which, owing to the large amount of carbon they contain, require the use of a cone or cap placed over the wick-tube and wick, and a chimney so arranged as to cause a free supply of air below the cone or cap. In order to light the lamp, trim the wick, or replenish the oil, it is necessary to remove or displace the glass chimney and the cone, which, when the lamp is in use, is a great inconvenience, as the chimney and cone become very much heated, and, even if this is not the case, the necessity for the frequent removal of the glass chimneys causes them to be often broken. Another objection to the use of these lamps is, that if it is desired to light them at night, it is difficult and troublesome to remove the chimney and cone in the dark. All these obstacles to the convenient use of such lamps are overcome by combining in the construction of the lamp the following features, viz: Uniting the crown or top piece of the burner with the cone, or constructing these two parts in one piece, inserting a tube for filling the lamp with oil inside the burner-frame and under the cone, and making the crown-piece separate from the perforated ring below the crown, and connecting them with a hinge or pivot and spring-catch, so that by turning the crown piece over on its hinge, the chimney and cone are easily and at once removed, exposing the wick-tube and wick and the aperture for refilling the lamp with oil.

In the drawing, Fig. 1 represents a lamp for burning coal or carbon oil. The perforated burning-frame *a*, with its flat wick-holder *b* and cone or cap *c*, the crown-piece *d*, in which the crown is placed, and the glass chimney *e*, may be all of any ordinary construction, excepting that the crown-piece *d* and perforated burning-frame *a*, which are usually made in one piece, are made separate, and the cone, which is usually separate, is attached to the crown-piece, so as to form a single part with it. The top of the perforated burner-frame *a*, where it comes in contact with the base of the crown-piece *d*, is furnished with a bead or flange, *f*, so as to give a bearing for the crown-piece. The crown-piece and cone are connected with the burner-frame *a* by a hinge, *h*, so constructed as to allow the crown-piece to be turned over to one side far enough to be out of the way in trimming the lamp, and yet not so far as to allow the glass chimney to come in contact with the oil-receptacle *g*, or other part of the lamp, as it might thus be liable to break.

On the opposite side of the burner-frame *a* is a spring-catch, *i*, which, when the crown-piece is shut down, passes over the bead *k* on the rim of the crown-piece, and thus securely holds it in place, a thumb-piece, *l*, on the spring serving to depress the spring and leave the crown-piece *d* free to be turned over when desired.

It will be seen by reference to Fig. 2 that when the crown-piece and cone are turned over, the chimney being secured by a screw, *s*, or spring, in the usual manner, is likewise removed out of the way, and thus the lamp may be lighted, a new wick inserted, or the wick trimmed, without any inconvenience. If preferred to have the cone or cap detached from the other part of the burner, as in the ordinary construction of lamps, this may be done by hinging the crown-piece *d* to the burner-frame *a*, as described, and placing the cone loose, either inside the crown-piece or under it, inside the burner-frame *a;* but the method described of making the cone in one piece with the crown simplifies the construction of the lamp.

Within the circumference of the burner-frame *a*, as thus constructed, is introduced a tube, *m*, which opens into the oil-chamber of the lamp, and is furnished with a plug or screw-cap, *n*. It is placed to one side of the wick-tube, and on that side which is farthest from the hinge of the crown-piece, so as to be more easily reached with the mouth of the oil-can. Through this filling-tube *m* the lamp may be replenished with oil at pleasure, and as the filling-tube is under the cone or cap *c*, it is covered and concealed by it, but may be exposed by turning back the hinged crown-piece and cone, in the manner before described.

This is a great convenience in filling lamps, as it avoids the necessity of unscrewing the burner-frame from the lamp and removing the wick when filling the lamp with oil, and, as here used, in combination with the hinged chimney-holder, it enables the lamp to be refilled with oil without removing the chimney entirely from the burner-frame, so that, by means of this combination of devices, the lamp may be replenished or lighted, or the wick trimmed, without having to displace the glass chimney, thus effecting a saving of time, being much more convenient, and avoiding the frequent breakage of chimneys consequent on the necessity of removing them every time any of those operations have to be performed.

It may here be observed that supply or feed tubes fitted with plugs or screw-caps have been used in oil-lamps before; but this improvement consists in placing the filling-tube inside of the burner-frame, in combination with the separate hinged crown-piece, by means of which it can be reached without removing the glass chimney and cone.

What is claimed is—

A lamp-burner, provided with a supply or feed tube for the oil placed within the circumference of the burner-frame and under the cone or cap, in combination with a burner-frame, having a chimney-holder hinged or pivoted to the burner-frame for the purpose of enabling the lamp to be replenished without either unscrewing the burner-frame from its socket or removing the glass chimney from the lamp, substantially as described.

HORACE CRAIGHEAD,
*Treasurer of the Ives Patent Lamp Co.*
RIVERIUS MARSH,
*Secretary of the Ives Patent Lamp Co.*

Witnesses:
FRED. HAYNES,
BENJAMIN W. HOFFMAN.